United States Patent
Uchino et al.

(10) Patent No.: US 9,883,536 B2
(45) Date of Patent: Jan. 30, 2018

(54) RADIO BASE STATION AND MOBILE STATION

(71) Applicant: NTT DOCOMO, INC., Tokyo (JP)

(72) Inventors: Tooru Uchino, Tokyo (JP); Sadayuki Abeta, Tokyo (JP); Kazuaki Takeda, Tokyo (JP); Hiroyuki Ishii, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 60 days.

(21) Appl. No.: 14/760,128

(22) PCT Filed: Dec. 5, 2013

(86) PCT No.: PCT/JP2013/082661
§ 371 (c)(1),
(2) Date: Jul. 9, 2015

(87) PCT Pub. No.: WO2014/112237
PCT Pub. Date: Jul. 24, 2014

(65) Prior Publication Data
US 2015/0359002 A1     Dec. 10, 2015

(30) Foreign Application Priority Data

Jan. 18, 2013  (JP) ................................ 2013-007667

(51) Int. Cl.
*H04J 3/24*    (2006.01)
*H04W 74/08*  (2009.01)
(Continued)

(52) U.S. Cl.
CPC ........... *H04W 74/085* (2013.01); *H04W 8/26* (2013.01); *H04W 16/32* (2013.01)

(58) Field of Classification Search
None
See application file for complete search history.

(56) References Cited

U.S. PATENT DOCUMENTS

| 8,229,446 | B2 * | 7/2012 | Shin ...................... H04W 48/12 370/329 |
| 8,359,039 | B2 * | 1/2013 | McBeath ............... H04L 5/0091 370/328 |

(Continued)

FOREIGN PATENT DOCUMENTS

| WO | 2010/050234 A1 | 5/2010 |
| WO | 2010145520 A1 | 12/2010 |

(Continued)

OTHER PUBLICATIONS

Partial Supplementary European Search Report in counterpart European Patent Application No. 13871399.5, dated Jul. 12, 2016 (7 pages).

(Continued)

*Primary Examiner* — Kwang B Yao
*Assistant Examiner* — Juvena Loo
(74) *Attorney, Agent, or Firm* — Osha Liang LLP

(57) ABSTRACT

A system and method to prevent collision between mobile stations to which the same C-RNTI is allocated in a simple implementation while avoiding a problem of C-RNTI depletion in a phantom cell is disclosed. A radio base station includes an allocation unit configured to allocate multiple C-RNTIs to each of mobile stations, and the allocation unit performs adjustment such that collision of search spaces to which PDCCH resources are allocated does not occur among the multiple mobile stations.

1 Claim, 13 Drawing Sheets

(51) Int. Cl.
*H04W 8/26* (2009.01)
*H04W 16/32* (2009.01)

(56) References Cited

U.S. PATENT DOCUMENTS

| | | | | |
|---|---|---|---|---|
| 2011/0044259 A1* | 2/2011 | Nimbalker | | H04L 5/001 370/329 |
| 2011/0069637 A1* | 3/2011 | Liu | | H04L 5/0007 370/254 |
| 2011/0194525 A1 | 8/2011 | Nishio et al. | | |
| 2011/0274077 A1 | 11/2011 | Yamada et al. | | |
| 2012/0063401 A1* | 3/2012 | Xue | | H04L 5/001 370/329 |
| 2012/0106494 A1* | 5/2012 | Moulsley | | H04L 5/0091 370/329 |
| 2013/0114534 A1* | 5/2013 | Ji | | H04W 72/0406 370/329 |
| 2013/0150109 A1 | 6/2013 | Takano | | |

FOREIGN PATENT DOCUMENTS

| | | |
|---|---|---|
| WO | 2012/046506 A1 | 4/2012 |
| WO | 2012104644 A1 | 8/2012 |

OTHER PUBLICATIONS

International Search Report issued in PCT/JP2013/082661 dated Feb. 18, 2014 (1 page).
Written Opinion of the International Searching Authority issued in PCT/JP2013/082661 dated Feb. 18, 2014 (3 pages).
3GPP TS 36.300 V11.3.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)"; Sep. 2012 (205 pages).
Extended European Search Report issued in the counterpart European Patent Application No. 13871399.5, dated Oct. 19, 2016 (12 pages).
Office Action issued in the counterpart Japanese Patent Application No. 2013-007667, dated Jan. 10, 2017 (7 pages).

* cited by examiner

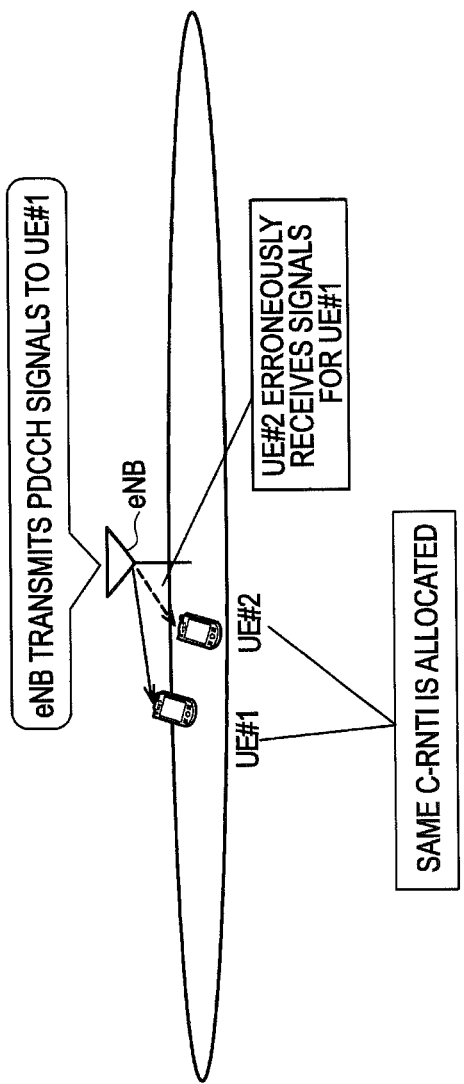

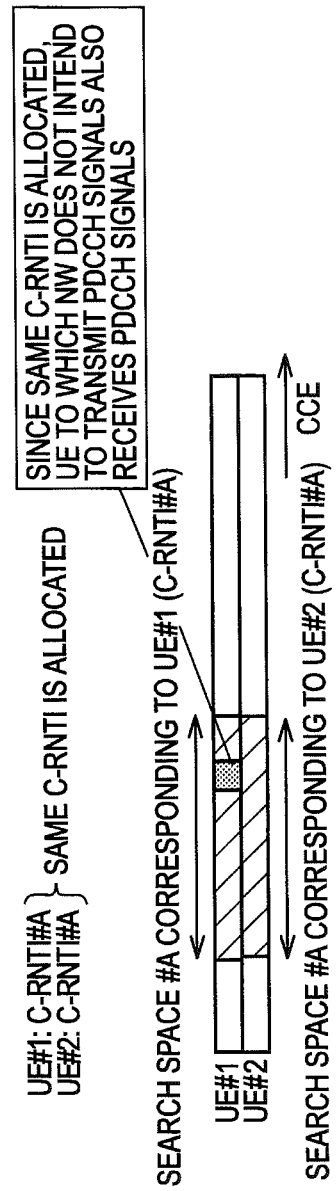

RADIO BASE STATION AND MOBILE STATION

TECHNICAL FIELD

The present invention relates to a radio base station and a mobile station.

BACKGROUND ART

In LTE (Long Term Evolution), as shown in FIG. 9, radio base stations eNB#A and eNB#B are configured to allocate C-RNTIs (Cell-Radio Network Temporary Identities) to mobile stations UE performing communication in cells #A and #B under the radio base stations eNB#A and eNB#B and to perform data exchange with the mobile stations UE (see Non-Patent Document 1).

The allocation of C-RNTIs is performed cell by cell. In LTE, as shown in FIG. 9, the same C-RNTI cannot be allocated to a mobile station UE#1 and a mobile station UE#2 which perform communication in the same cell #A. Meanwhile, the same C-RNTI can be allocated to the mobile station UE#1 (or the mobile station UE#2) and a mobile station UE#3 which perform communication in the different cells #A and #B, respectively.

The C-RNTIs are configured to be allocated in a "Contention based RA (Random Access) procedure" and a handover procedure.

Moreover, the radio base station eNB is configured to allocate resources for downlink data transmission and uplink data transmission by using the C-RNTI allocated to each of the mobile stations UE.

Meanwhile, in the "Rel-12 workshop" of 3GPP, many proposals on "Small cell enhancement" have been made as a topic of FRA (Future Radio Access).

In such proposals, a concept related to "phantom cell" is being considered.

As shown in FIG. 10, unlike a conventional macro cell, the phantom cell forms one large cell by combining many small cells and can cover a large area.

PRIOR ART DOCUMENT

Non-Patent Document

Non-patent document 1: 3GPP TS36.300

SUMMARY OF THE INVENTION

However, as shown in FIG. 11, 65535 C-RNTIs are managed in each of the cells (macro cells and phantom cells) and one C-RNTI needs to be allocated to each of the mobile stations UE.

When a coverage area of the phantom cell is large, the number of mobile stations UE performing communication in the phantom cell increases, and the following problem is conceivable: there is a possibility that the C-RNTIs to be allocated to the mobile stations UE deplete in the phantom cell.

In order to overcome this problem, the following operation is conceivable. As shown in FIG. 12, although one C-RNTI is allocated to each of mobile stations UE in the macro cell, one C-RNTI is allocated to multiple mobile stations UE in the phantom cell (i.e. one C-RNTI is shared by multiple mobile stations UE).

However, in this operation, as shown in FIG. 13, there is a possibility that the mobile stations UE#1 and UE#2 to which the same C-RNTI is allocated in the same cell receive the same PDCCH (Physical Downlink Control Channel) and the mobile station UE#2 to which the radio base station eNB does not intend to send information erroneously receives allocation information for the mobile station UE#1.

Specifically, since LTE is configured such that a search space to be searched by each mobile station UE is uniquely determined depending on the C-RNTI, the search spaces to be searched by the mobile stations UE#1 and UE#2 are the same if the same C-RNTI#A is allocated to the mobile stations UE#1 and UE#2 as shown in FIG. 14.

Hence, a PDCCH signal for the mobile station UE#1 transmitted by the radio base station eNB is received by not only the mobile station eNB#1 but also the mobile station UE#2.

As a result, the mobile station UE#2 with which the radio base station eNB does not intend to exchange signals may receive downlink signals or transmit uplink signals.

Hereafter, such situation is referred to as "collision between the radio base stations UE".

Note that a case where the mobile station UE#2 with which the radio base station eNB does not intend to exchange signals receives downlink signals through a PDSCH (Physical Downlink Shared Channel) is a problem from the view point of IOT (Interoperability Test).

Moreover, when the mobile station UE#2 with which the radio base station eNB does not intend to exchange signals transmits uplink signals through a PUSCH (Physical Uplink Shared Channel), this transmission causes interference with the other mobile station UE#1.

The present invention has been made in view of the problems described above, and an objective thereof is to provide a radio base station and a mobile station which can prevent collision between mobile stations to which the same C-RNTI is allocated in a simple implementation while avoiding the problem of C-RNTI depletion in a phantom cell.

A first feature of the present invention is summarized as a radio base station including an allocation unit configured to allocate a plurality of C-RNTIs to each of mobile stations. Here, the allocation unit performs adjustment such that collision of search spaces to which PDCCH resources are allocated does not occur between the mobile stations.

A second feature of the present invention is summarized as a mobile station including: a management unit configured to manage a plurality of C-RNTIs allocated by a radio base station; and a reception unit configured to search for a PDCCH resource for the mobile station in search spaces corresponding to the plurality of C-RNTIs.

A third feature of the present invention is summarized as a mobile station including: a management unit configured to manage a plurality of C-RNTIs allocated by a radio base station; and a reception unit configured to search for a PDCCH resource for the mobile station in a search space corresponding to a primary C-RNTI out of the plurality of C-RNTIs by performing descrambling processing in a portion of the search space by using the primary C-RNTI and by performing descrambling processing in a remaining portion of the search space by using a secondary C-RNTI out of the plurality of C-RNTIs.

BRIEF DESCRIPTION OF THE DRAWINGS

FIG. 13 is a view for explaining a prior art.

FIG. 14 is a view for explaining a prior art.

DETAILED DESCRIPTION (Mobile Communication System of First Embodiment of Present Invention)

A mobile communication system according to a first embodiment of the present invention will be described with reference to FIGS. 1 to 5.

Figure 1:
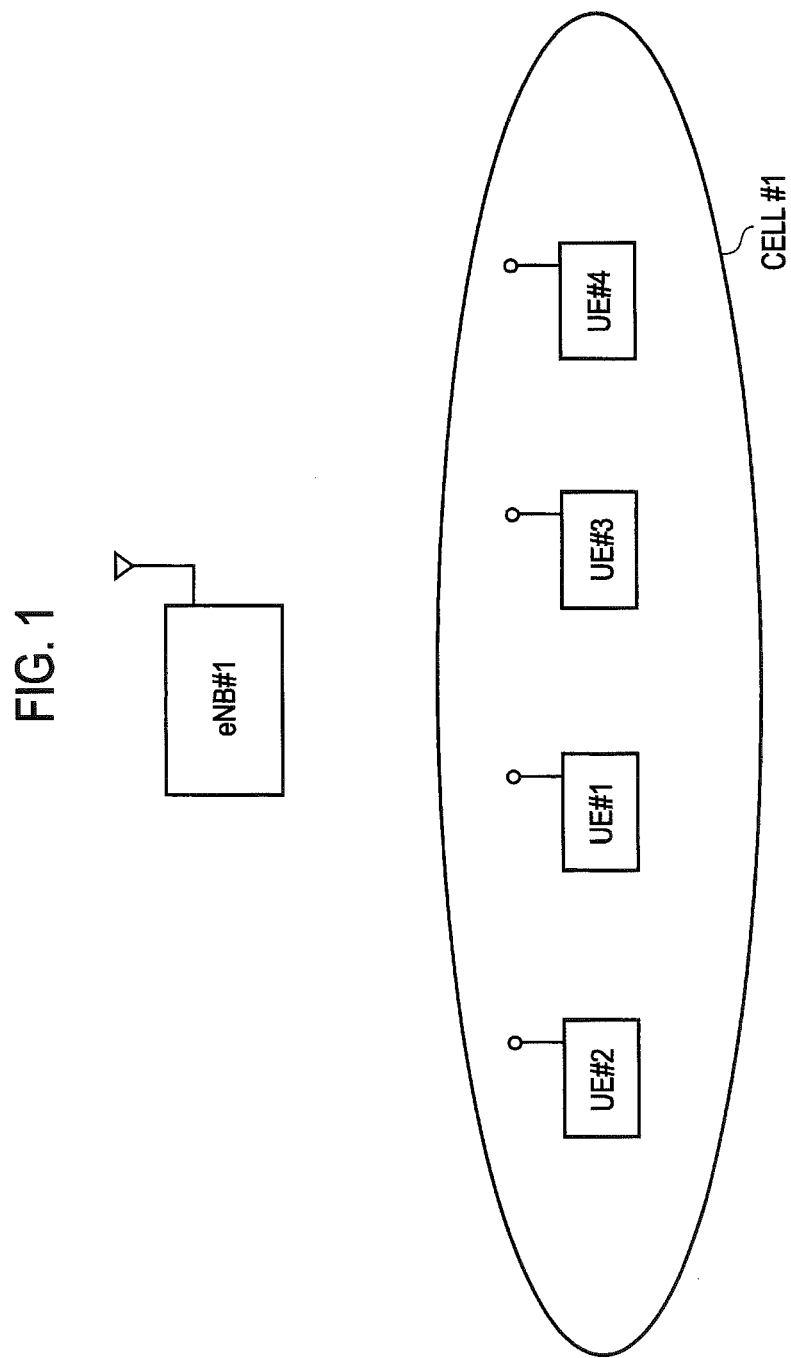
FIG. 1 is an overall configuration diagram of a mobile communication system according to a first embodiment of the present invention.

As shown in FIG. 1, the mobile communication system of the present embodiment is an LTE mobile communication system and includes a radio base station eNB#1 managing a cell #1. Here, the cell #1 is a phantom cell formed by combining multiple small cells.

Moreover, in the mobile communication system of the present embodiment, it is assumed that mobile stations UE#1 to UE#4 exist in the cell #1 as shown in FIG. 1.

Figure 2:
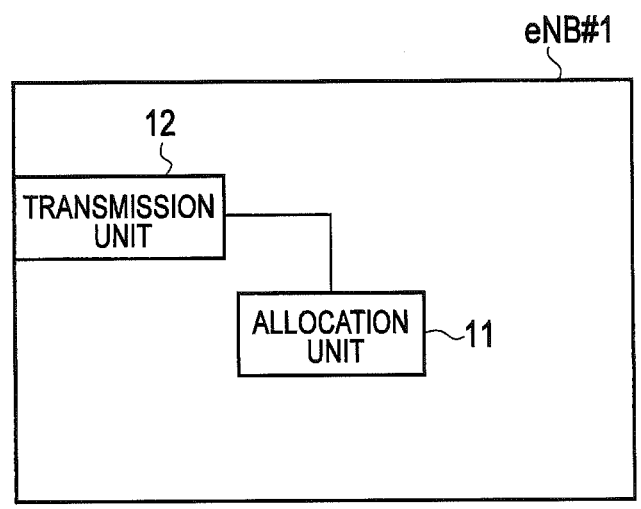
FIG. 2 is a functional block diagram of a radio base station according to the first embodiment of the present invention.

As shown in FIG. 2, the radio base station eNB#1 of the present embodiment includes an allocation unit 11 and a transmission unit 12.

The allocation unit 11 is configured to be capable of allocating multiple C-RNTIs to each of the mobile stations UE#1 to UE#4.

Figure 3:
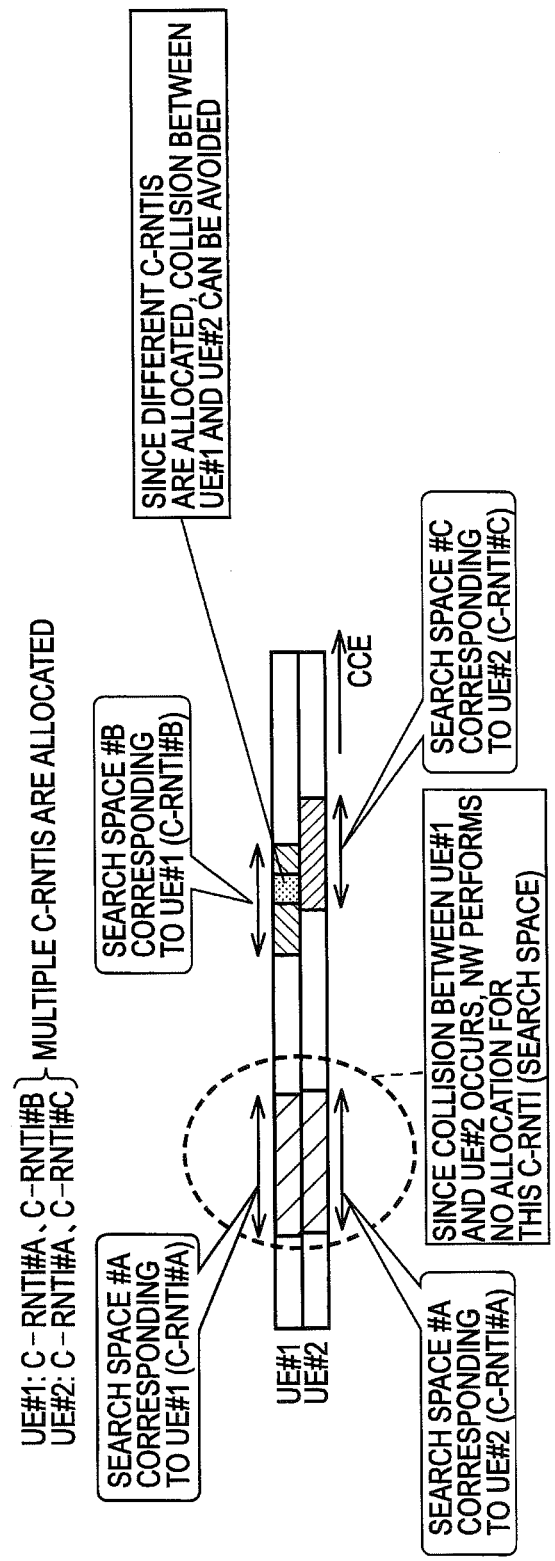
FIG. 3 is a view for explaining operations of the radio base station and mobile stations according to the first embodiment of the present invention.

As shown in FIG. 3, in the mobile communication system of the present embodiment, the allocation unit 11 is configured to allocate a C-RNTI#A and a C-RNTI#B to the mobile station UE#1 and allocate the C-RNTI#A and a C-RNTI#C to the mobile station UE#2.

The allocation unit 11 is configured to perform adjustment such that collision of search spaces to which PDCCH resources are allocated do not occur among the multiple mobile stations UE#1 to UE#4.

As described above, the mobile communication system is configured such that the search space to be searched by each of the mobile stations is uniquely determined depending on a C-RNTI.

As shown in FIG. 3, the allocation unit 11 thus performs adjustment such that the a PDCCH resource for the mobile station UE#1 is allocated to a search space #B corresponding to the C-RNTI#B, and a PDCCH resource for the mobile station UE#2 is allocated to a search space #C corresponding to the C-RNTI#C. This can avoid occurrence of the collision described above.

Specifically, if the PDCCH resource for the mobile station UE#1 (or the PDCCH resource for the mobile station UE#2) is allocated to a search space #A, there is a possibility that a PDCCH signal is received by the both of the mobile station UE#1 and the mobile station UE#2. Accordingly, the allocation unit 11 allocates no PDCCH resource for the mobile station UE#1 (or the PDCCH resource for the mobile station UE#2) to the search space #A.

The allocation unit 11 may be configured to determine whether collision occurs between the mobile station UE#1 and the mobile station UE#2 by considering the distance between the mobile station UE#1 and the mobile station UE#2 and the like.

The distance between the mobile station UE#1 and the mobile station UE#2 may be expressed as the physical distance between the mobile stations UE or as the physical distance between the cells or the radio base stations eNB to which the respective mobile stations UE are connected.

The transmission unit 12 is configured to transmit various signals to each of the mobile stations UE#1 to UE#4.

For example, the transmission unit 12 is configured to notify each of the mobile stations UE#1 to UE#4 of the C-RNTIs allocated by the allocation unit 11.

Moreover, the transmission unit 12 is configured to transmit the PDCCH signals to each of the mobile stations UE#1 to UE#4 by using the PDCCH resource allocated by the allocation unit 11.

Figure 4:
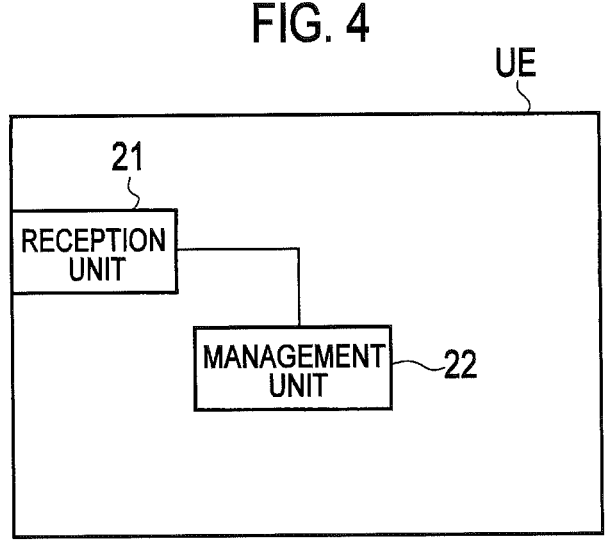
FIG. 4 is a functional block diagram of a mobile station according to the first embodiment of the present invention.

Here, since the configurations of the mobile stations UE#1 to UE#4 are basically the same, their configurations will be described as the configuration of the mobile station UE. As shown in FIG. 4, the mobile station UE of the present embodiment includes a reception unit 21 and a management unit 22.

The reception unit 21 is configured to receive various signals from the radio base station eNB.

For example, the reception unit 21 is configured to receive multiple C-RNTIs which are notified to the mobile station UE by the radio base station eNB and which are allocated to the mobile station UE, from the radio base station eNB.

The reception unit 21 may be configured to receive the multiple C-RNTIs through "RRC Connection Reconfiguration", "RRC Connection Configuration", or the like transmitted by the radio base station eNB.

The management unit 22 is configured to manage the multiple C-RNTIs received by the reception unit 21.

The reception unit 21 is configured to search all of the search spaces, corresponding to the multiple C-RNTIs managed by the management unit 22, for the PDCCH resource for the mobile station UE, i.e. attempts decoding of the PDCCH signals for the mobile station UE.

For example, as shown in FIG. 3, the reception unit 21 of the mobile station UE#1 is configured to attempt decoding of the PDCCH signals for the mobile station UE in the search spaces #A and #B, and the reception unit 21 of the mobile station UE#2 is configured to attempt decoding of the PDCCH signals for the mobile station UE in the search spaces #A and #C.

As a result, the mobile stations UE#1 and UE#2 can each receive the PDCCH signals for itself without colliding with each other.

An operation of the mobile communication system in the present embodiment, specifically an operation of the mobile station UE in the present embodiment will be described below with reference to FIG. 5.

Figure 5:
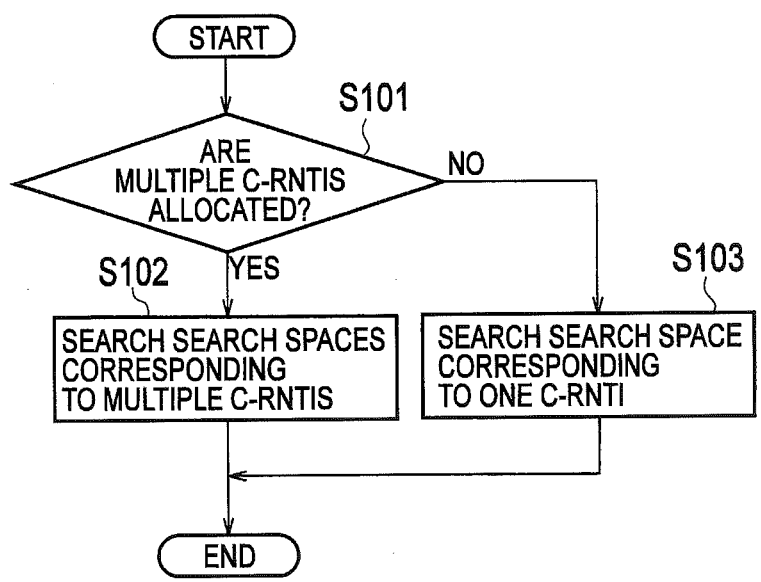
FIG. 5 is a flowchart showing an operation of the mobile station according to the first embodiment of the present invention.

As shown in FIG. 5, in step S101, the mobile station UE determines whether multiple C-RNTIs are allocated to the mobile station UE by the radio base station eNB.

If "YES", the operation proceeds to step S102. If "NO", the operation proceeds to step S103.

In step S102, the mobile station UE searches for the PDCCH resource in all of search spaces corresponding to the multiple C-RNTIs.

Meanwhile, in step S103, the mobile station UE searches for the PDCCH resource in a search space corresponding to one C-RNTI.

(First Modified Example)

A mobile communication system according to a first modified example of the present invention will be described below with reference to FIGS. 6 to 8, focusing on differences from the aforementioned mobile communication system in the first embodiment.

Figure 6:
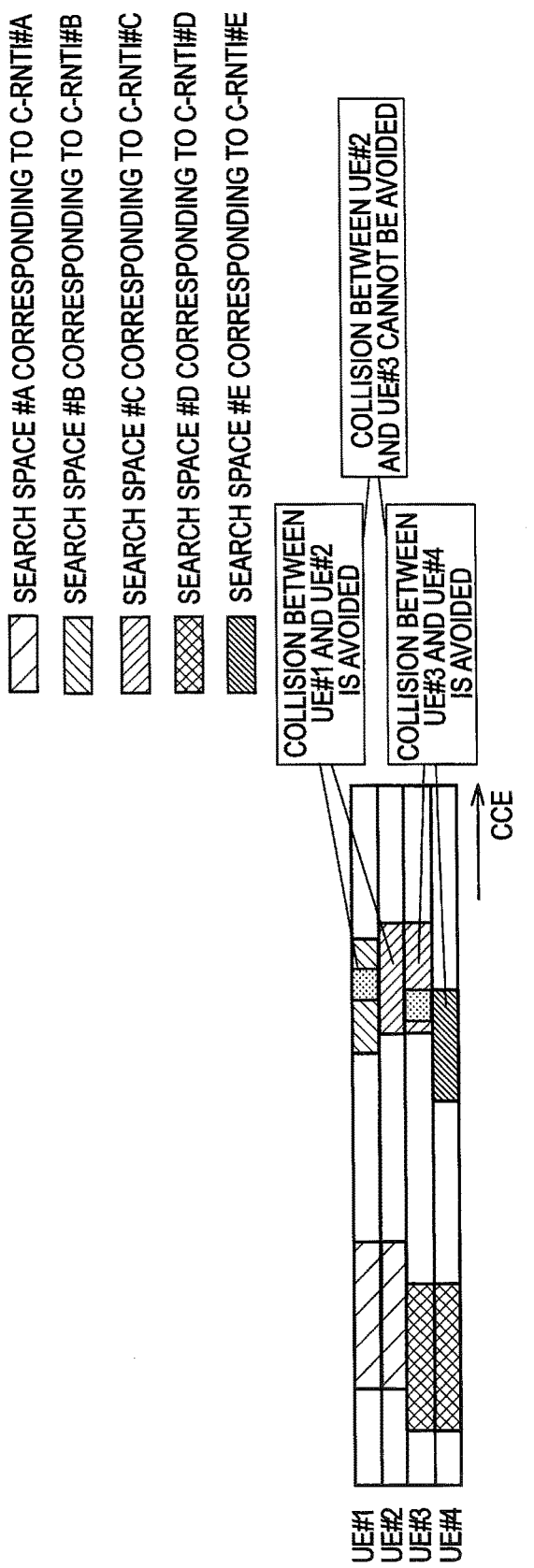
FIG. 6 is a view for explaining operations of the radio base station and the mobile stations according to a first modified example of the present invention.

As shown in FIG. 6, in a case where: the allocation unit 11 of the radio base station eNB allocates the C-RNTI#A and the C-RNTI#B to the mobile station UE#1, the C-RNTI#A and the C-RNTI#C to the mobile station UE#2, a C-RNTI#D and the C-RNTI#C to the mobile station UE#3, and the C-RNTI#D and a C-RNTI#E to the mobile station UE#4; and the allocation unit 11 allocates the PDCCH resource for the mobile station UE#1 to the search space #B corresponding to the C-RNTI#B, the PDCCH resource for the mobile station UE#2 to the search space #0 corresponding to the C-RNTI#C, the PDCCH resource for the mobile station UE#3 to the search space #0 corresponding to the C-RNTI#C, and the PDCCH resource for the mobile station UE#4 to a search space #E corresponding to the C-RNTI#E, collision between the mobile station UE#1 and the mobile station UE#2 and collision between the mobile station UE#3 and the mobile station UE#4 can be prevented. However, collision between the mobile station UE#2 and the mobile station UE#3 cannot be prevented.

In view of this, in the mobile communication system of the first modified example, the reception unit 21 of the mobile station UE is configured to search for the PDCCH resource for the mobile station UE in a search space corresponding to a "Primary C-RNTI" out of the multiple C-RNTIs managed by the management unit 22 by performing descrambling processing in one portion of the search space by using the "Primary C-RNTI", and by performing the descrambling processing in a remaining portion of the search space by using a "Secondary C-RNTI" out of the multiple C-RNTIs.

In this example, the radio base station eNB is configured to notify the mobile station UE of the "Primary C-RNTI" and the "Secondary C-RNTI".

Figure 7:
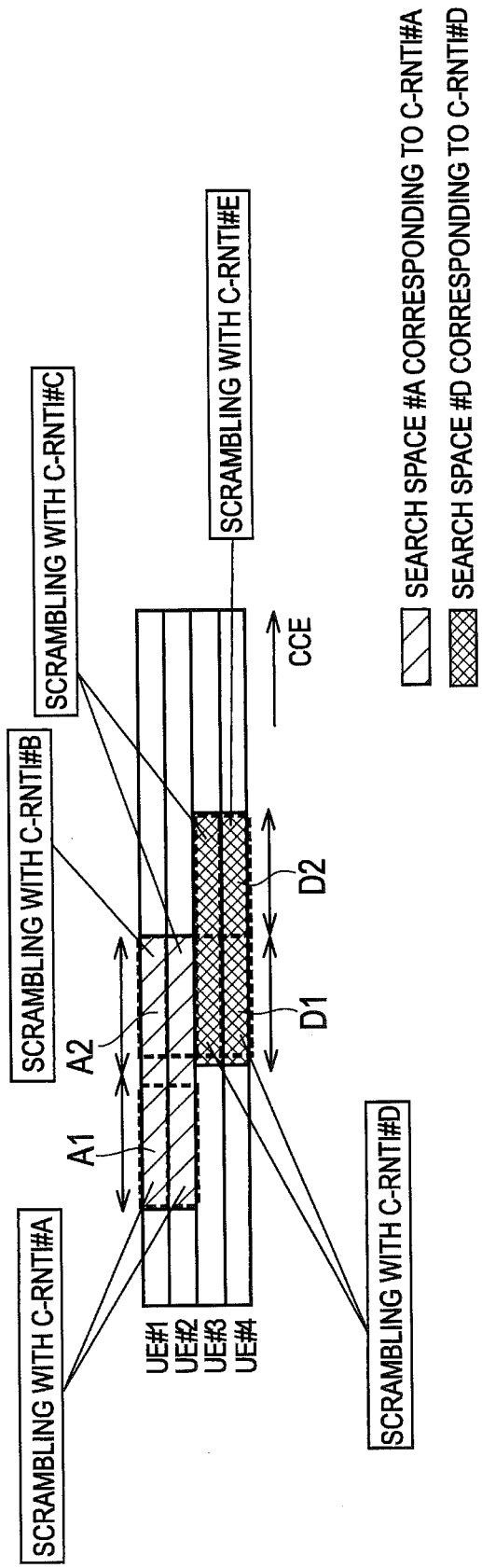
FIG. 7 is a view for explaining operations of the radio base station and the mobile stations according to the first modified example of the present invention.

For example, as shown in FIG. 7, the reception unit 21 of the mobile station UE#1 is configured to search for the PDCCH resource for the mobile station UE#1 in the search space #A corresponding to the C-RNTI#A which is the "Primary C-RNTI" by performing the descrambling processing in one portion #A1 of the search space #A by using the C-RNTI#A, and by performing the descrambling processing in a remaining portion #A2 of the search space #A by using the C-RNTI#B.

Moreover, the reception unit 21 of the mobile station UE#2 is configured to search for the PDCCH resource for the mobile station UE#2 in the search space #A corresponding to the C-RNTI#A which is the "Primary C-RNTI" by performing the descrambling processing in the one portion #A1 of the search space #A by using the C-RNTI#A, and by performing the descrambling processing in the remaining portion #A2 of the search space #A by using the C-RNTI#C.

Furthermore, the reception unit 21 of the mobile station UE#3 is configured to search for the PDCCH resource for the mobile station UE#3 in a search space #D corresponding to the C-RNTI#D which is the "Primary C-RNTI" by performing the descrambling processing in one portion #D1 of the search space #D by using the C-RNTI#D, and by performing the descrambling processing in a remaining portion #D2 of the search space #D by using the C-RNTI#C.

Moreover, the reception unit 21 of the mobile station UE#4 is configured to search for the PDCCH resource for the mobile station UE#4 in the search space #D corresponding to the C-RNTI#D which is the "Primary C-RNTI" by performing the descrambling processing in the one portion #D1 of the search space #D by using the C-RNTI#D, and by performing the descrambling processing in the remaining portion #D2 of the search space #D by using C-RNTI#E.

The radio base station eNB is configured to notify the mobile stations UE of the aforementioned one portion #A1/#D1 of the search space and the aforementioned remaining portion #A2/#D2 of the search space in the cases described above.

Note that the ratio of the aforementioned one portion #A1/#D1 of the search space to the aforementioned remaining portion #A2/#D2 may be determined in advance.

The allocation unit 11 of the radio base station eNB is configured to allocate the PDCCH resource for the mobile station UE#1 to the remaining portion #A2 of the search space #A corresponding to the C-RNTI#A and performs scrambling processing by using the C-RNTI#B in the case described above.

Moreover, the allocation unit 11 of the radio base station eNB is configured to allocate the PDCCH resource for the mobile station UE#2 to the remaining portion #A2 of the search space #A corresponding to the C-RNTI#A and perform the scrambling processing by using the C-RNTI#C.

Furthermore, the allocation unit 11 of the radio base station eNB is configured to allocate the PDCCH resource for the mobile station UE#3 to the remaining portion #D2 of the search space #D corresponding to the C-RNTI#D and perform the scrambling processing by using the C-RNTI#C.

Moreover, the allocation unit 11 of the radio base station eNB is configured to allocate the PDCCH resource for the mobile station UE#4 to the remaining portion #D2 of the search space #D corresponding to the C-RNTI#D and perform the scrambling processing by using the C-RNTI#E.

An operation of the mobile communication system in the first modified example, specifically, an operation of the mobile station UE in the present modified example will be described below with reference to FIG. 8.

Figure 8:
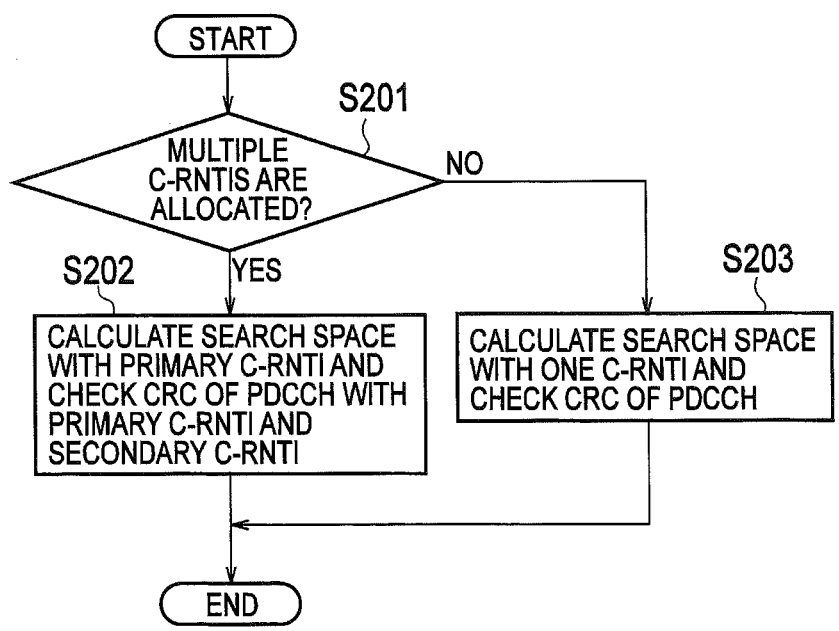
FIG. 8 is a flowchart showing an operation of the mobile station according to the first modified example of the present invention.
Figure 9:
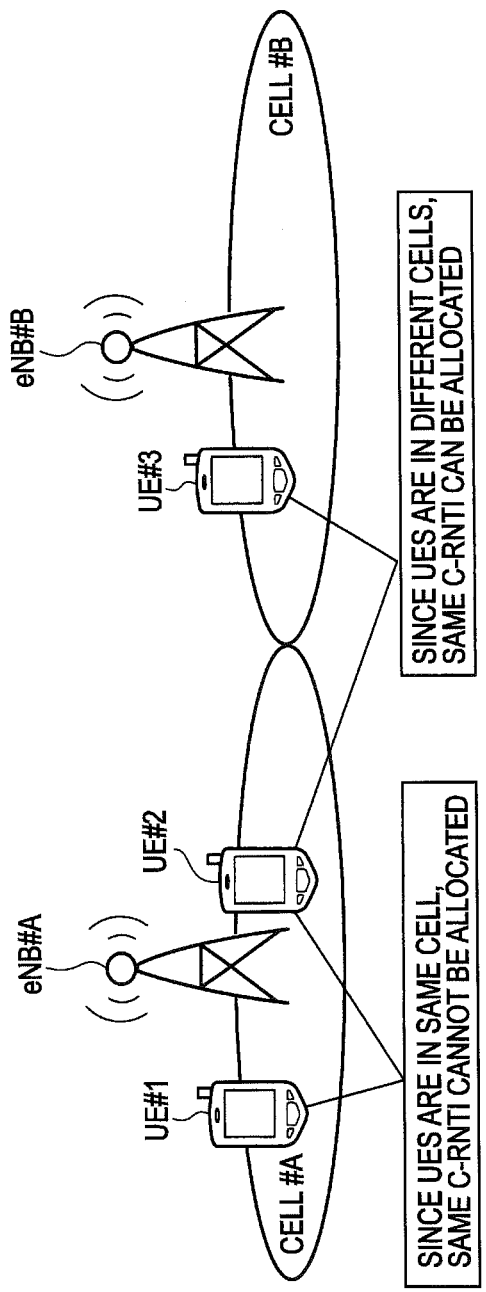
FIG. 9 is a view for explaining a prior art.
Figure 10:
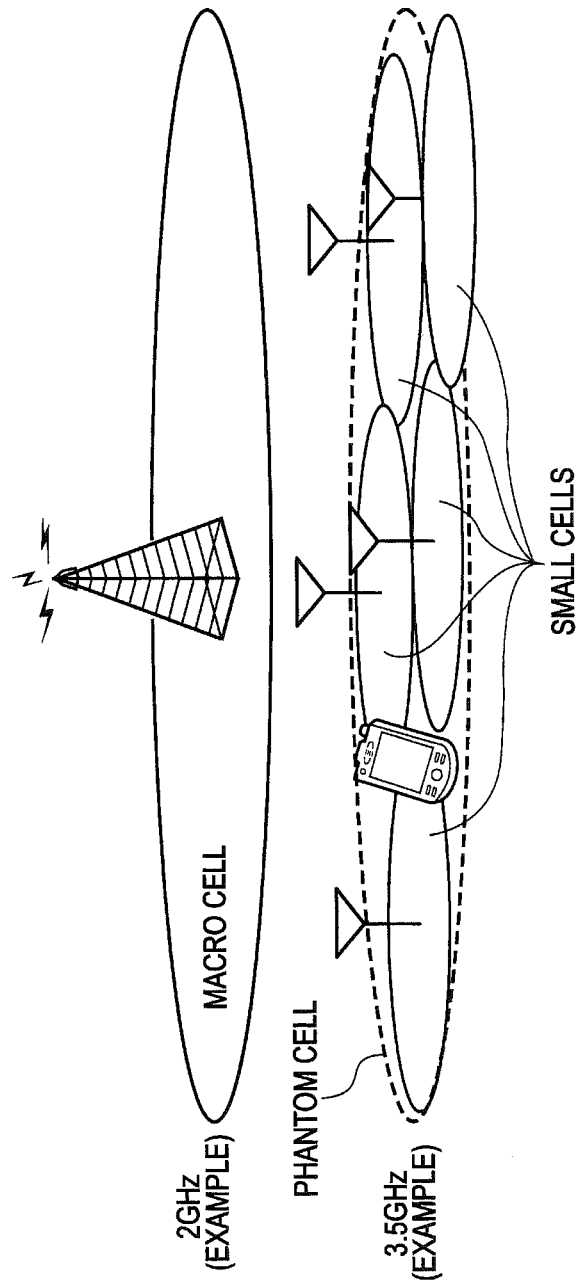
FIG. 10 is a view for explaining a prior art.
Figure 11:
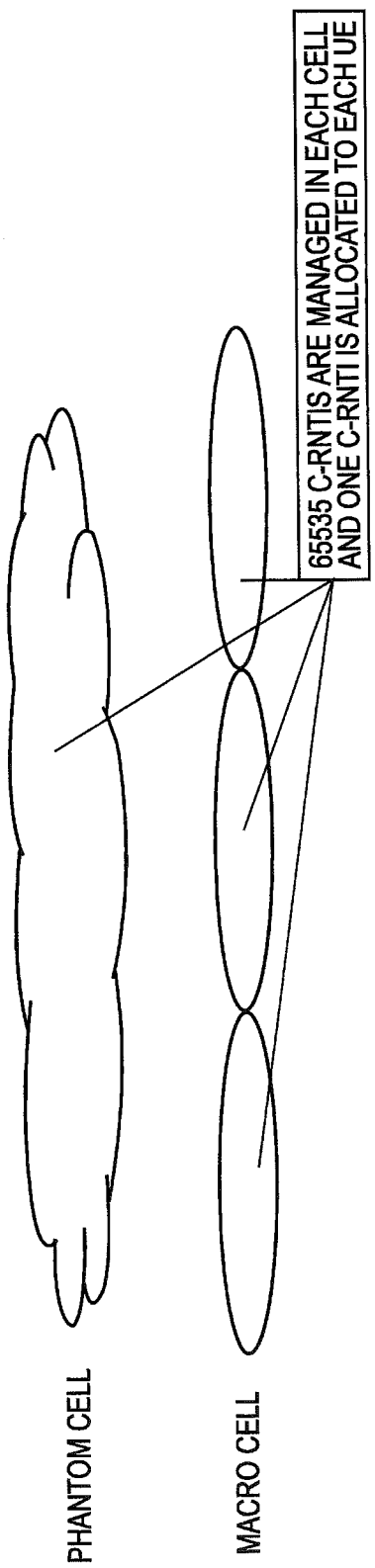
FIG. 11 is a view for explaining a prior art.
Figure 12:
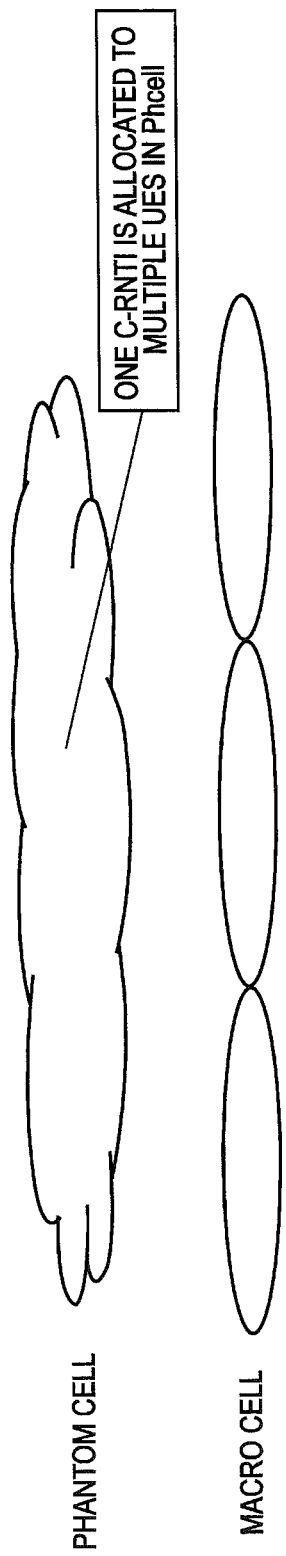
FIG. 12 is a view for explaining a prior art.

As shown in FIG. 8, in step S201, the mobile station UE determines whether multiple C-RNTIs are allocated to the mobile station UE by the radio base station eNB.

If "YES", the operation proceeds to step S202. If "NO", the operation proceeds to step S203.

In step S202, the mobile station UE performs the descrambling processing (i.e. checks CRC of PDCCH) in one portion of a search space corresponding to the "Primary C-RNTI" by using the "Primary C-RNTI" and performs the descrambling (i.e. checks CRC of PDCCH) in a remaining portion of the search space corresponding to the "Primary C-RNTI" by using the "Secondary C-RNTI".

Meanwhile, in step S203, the mobile station UE searches for a PDCCH resource in a search space corresponding to one C-RNTI (i.e. checks CRC of PDCCH by using the one C-RNTI).

The features of the present embodiment may also be expressed as follows.

A first feature of the present embodiment is summarized as a radio base station eNB including an allocation unit 11 configured to allocate multiple C-RNTIs to each of mobile stations UE#1 to UE#4. Here, the allocation unit 11 performs adjustment such that collision of search spaces to which PDCCH resources are allocated does not occur between the mobile stations UE#1 to UE#4.

In such a configuration, it is possible to prevent collisions between the mobile stations UE while avoiding the problem of C-RNTI depletion in a phantom cell.

In the first feature of the present embodiment, the allocation unit 11 performs the adjustment in consideration of a distance between two of the mobile stations UE#1 to UE#4.

In such a configuration, the radio, base station eNB determines that no collision occurs between the mobile stations UE which are away from each other by a predetermined distance or more in a phantom cell even when the same C-RNTI is allocated to the mobile stations, and may not perform the aforementioned adjustment. As a result, it is possible to reduce the processing load of the radio base station eNB.

A second feature of the present embodiment is summarized as a mobile station UE including: a management unit 22 configured to manage multiple C-RNTIs allocated by a radio base station eNB; and a reception unit 21 configured to search for a PDCCH resource for the mobile station UE in search spaces corresponding to the multiple C-RNTIs.

In such a configuration, it is possible to prevent collisions between the mobile stations UE while avoiding the problem of C-RNTI depletion in a phantom cell.

A third feature of the present embodiment is summarized as a mobile station UE including: a management unit 22 configured to manage multiple C-RNTIs allocated by a radio base station eNB; and a reception unit 21 configured to search for a PDCCH resource for the mobile station UE in a search space corresponding to a "Primary C-RNTI" out of the multiple C-RNTIs by performing descrambling processing in a portion of the search space by using the "Primary C-RNTI" and by performing descrambling processing in a remaining portion of the search space by using a "Secondary C-RNTI" out of the multiple C-RNTIs.

In such a configuration, it is possible to prevent collisions between the mobile stations UE while avoiding the problem of C-RNTI depletion even when many mobile stations UE exist in a phantom cell.

It should be noted that the foregoing operations of the mobile stations UE#1 to UE#4 and the radio base station eNB may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile stations UE#1 to UE#4 and the radio base station eNB. Otherwise, the storage medium and the processor may be provided as discrete components inside the mobile stations UE#1 to UE#4 and the radio base station eNB.

Hereinabove, the present invention has been described in detail by use of the foregoing embodiment. However, it is apparent to those skilled in the art that the present invention should not be limited to the embodiment described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2013-007667 (filed on Jan. 18, 2013) is incorporated by reference in the present specification.

INDUSTRIAL APPLICABILITY

As described above, the present invention can provide a radio base station and a mobile station which is capable of preventing collisions between mobile stations to which the same C-RNTI is allocated in a simple implementation while avoiding the problem of C-RNTI depletion in a phantom cell.

EXPLANATION OF THE REFERENCE NUMERALS

UE#1 to UE#4 mobile station
eNB#1 radio base station
11 allocation unit
12 transmission unit
21 reception unit
22 management unit

The invention claimed is:

1. A radio base station comprising an allocation unit configured to allocate a plurality of C-RNTIs to each of mobile stations,
   wherein the allocation unit performs adjustment such that collision of search spaces to which PDCCH resources are allocated does not occur between the mobile stations,
   wherein the allocation unit allocates:
      a search space corresponding to a first C-RNTI of the plurality of C-RNTIs to a first mobile station of the mobile stations and a second mobile station of the mobile stations, and
      a search space corresponding to a second C-RNTI of the plurality of C-RNTIs to the first mobile station of the mobile stations but not to the second mobile station of the mobile stations, and wherein the allocation unit performs the adjustment in consideration of a distance between the mobile stations.

* * * * *